US 8,600,678 B2

(12) United States Patent
Kelly et al.

(10) Patent No.: US 8,600,678 B2
(45) Date of Patent: *Dec. 3, 2013

(54) SYSTEM AND METHOD FOR PRESENTING LIGHTNING STRIKE INFORMATION

(75) Inventors: Terence F. Kelly, Madison, WI (US); Victor W. Marsh, Fitchburg, WI (US)

(73) Assignee: Weather Central, LP, Madison, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 12/961,090

(22) Filed: Dec. 6, 2010

(65) Prior Publication Data

US 2011/0074814 A1   Mar. 31, 2011

Related U.S. Application Data

(63) Continuation of application No. 11/506,149, filed on Aug. 17, 2006, now Pat. No. 7,869,953.

(60) Provisional application No. 60/708,873, filed on Aug. 17, 2005.

(51) Int. Cl.
*G01W 1/00* (2006.01)
*G01S 3/02* (2006.01)

(52) U.S. Cl.
USPC .................. 702/4; 73/170.24; 342/460

(58) Field of Classification Search
USPC ............... 702/4, 1–3, 5, 127, 149–150, 158; 73/1.79, 170.16, 170.24; 324/72, 457; 340/601; 342/450, 458, 460; 345/418, 345/440, 467, 473, 581–582, 619, 629, 636, 345/654, 680, 689
See application file for complete search history.

(56) References Cited

U.S. PATENT DOCUMENTS

| | | | | |
|---|---|---|---|---|
| 6,339,747 B1 * | 1/2002 | Daly et al. | | 702/3 |
| 6,498,987 B1 * | 12/2002 | Kelly et al. | | 702/3 |
| 6,654,689 B1 * | 11/2003 | Kelly et al. | | 702/3 |
| 6,823,263 B1 * | 11/2004 | Kelly et al. | | 702/3 |
| 7,084,775 B1 * | 8/2006 | Smith | | 340/601 |
| 7,869,953 B1 * | 1/2011 | Kelly et al. | | 702/4 |

OTHER PUBLICATIONS

Cummins et al., The U.S. National Lightning Detection Network and Applications of Cloud-to-Ground Lightning Data by Electric Power Utilities, Nov. 1998, IEEE Transactions on Electromagnetic Compatibility, vol. 40, No. 4, pp. 465-480.*

* cited by examiner

*Primary Examiner* — Toan Le
(74) *Attorney, Agent, or Firm* — Meunier Carlin & Curfman, LLC

(57) ABSTRACT

A system and method for presenting lightning strike information in a manner so as to be easily understood and appreciated by viewers of televised weather report presentations and the like. Lightning strike information is displayed with a marker and textual indication of the lightning strike location in a viewer friendly format, e.g., a street address. Lightning strike data from a lightning strike data source is filtered to select individual lightning strikes to be displayed and processed to obtain the viewer friendly lightning strike location information to be presented overlaid on a geographic map or satellite image background. Personalized lighting strike information indicating the distance of a lighting strike from a viewer location of interest may be generated and provided directly to individual viewers via the interne, cellular phones, and/or other wired or wireless communication channels.

20 Claims, 4 Drawing Sheets

SYSTEM AND METHOD FOR PRESENTING LIGHTNING STRIKE INFORMATION

FIELD OF THE INVENTION

The present invention pertains generally to systems and methods for displaying representations of weather phenomena, e.g., overlaid on maps of geographic locations, for televised weather presentations, and the like, or otherwise electronically displayed or transmitted, and computer-based systems and methods for preparing and manipulating such presentations including systems and methods for processing and displaying lightning strike information.

BACKGROUND OF THE INVENTION

Various systems and methods have been developed for providing viewers of broadcast and cable television weather presentations with informative and accurate weather information. Typically, such systems provide a display of representations of weather phenomena, e.g., clouds, rain, storms, etc., overlaid on a map of a geographic area of interest. Such displays were originally created by drawing representations of weather phenomena, or placing pre-made weather phenomena symbols, on a physical map of an area of interest. The image of the map was then broadcast with a weather presenter positioned in front of the map to provide an explanation of the map display. Computer systems are now employed to facilitate the generation of such weather presentations, using computer-generated graphics and animation.

A typical computer-implemented system for preparing a weather report presentation will include detailed digital maps of geographic areas of interest stored for access by the computer. Weather information, such as satellite imagery and/or weather radar information, such as NEXRAD weather radar information provided by the government or live local radar data, is provided to the system. The system processes the received weather information that is then overlaid in graphical form on the digital maps to create a graphic display of the weather for a particular area of interest. The weather information received by the system may be processed to generate weather symbols, color contours, or other representations of the weather information that are overlaid on the digital maps to create the weather presentation. A series of such weather displays may be generated by the computer system, and played back in sequence to provide an animated image of the movement of weather phenomena through a geographic area. Such systems may provide an operator with various tools for selecting, e.g., the geographic location to be displayed, reference points to be displayed on the geographic map, e.g., cities, roads, borders, etc., the source of weather information to be displayed on the geographic map, e.g., satellite imagery or radar, and how the weather information will be presented, e.g., symbols, color contours, etc. An exemplary system and method for the preparation of graphical weather displays for broadcast as part of a weather report presentation, particularly for the preparation of weather displays that show the current and predicted path of severe weather, is described in U.S. Pat. No. 6,339,747, which is assigned to Weather Central, Inc., the assignee of the present application, the details of which are incorporated herein by reference.

Although a variety of different types of weather information are used to generate weather displays to be used as part of broadcast and other weather report presentations, not all of the currently available types of weather information typically are automatically processed for inclusion in such presentations. Some types of weather information are provided currently from their respective weather information sources in a form that is useful only to a trained meteorologist or other professional who can interpret the information as provided and then manually or orally incorporate the information into a broadcast weather report presentation. In other cases available weather information may be presented to viewers of a weather report presentation in a manner such that it is difficult for the typical viewer to understand the significance of the information or how the information relates to a particular interested, viewer. An example of weather information that is currently available but not currently presented as a part of weather presentations in a form that is useful to most viewers, if at all, is real time lightning strike information.

An important part of any televised or other weather report presentation is the presentation of information related to storms or other severe weather conditions. Weather forecasters and presenters, therefore, closely watch storm developments, in order to present the best available information to viewers. When a storm starts generating lightning, the lightning alerts forecasters to watch the storm for other dangerous weather elements, e.g., heavy rain, hail, flash flooding, high winds, downbursts, and tornadoes, that often occur with electrified storms. Weather forecasters may, for example, use lightning strike information provided by the National Lightning Detection Network (NLDN) to determine whether a storm is generating lightning. (Other sources of lightning strike information also may be available and used for the purposes described. For example, the United States Precision Lightning Network (USPLN) provides similar lightning strike information that is available from Weather Decision Technologies, Inc. of Norman, Okla.) The NLDN consists of over one hundred remote, ground-based sensing stations located across the United States that instantaneously detect the unique electromagnetic signals given off when lightning strikes the earth's surface, and can distinguish between cloud-to-cloud and cloud-to-ground lightning strikes and filter out the former. These remote sensors send raw lightning strike detection data via a satellite-based communications network to a network control center operated by Vaisala, Inc. in Tucson, Ariz. Within seconds of a lightning strike, the network control center's central analyzers process information on the location, time, polarity, and amplitude of each strike. The lightning information is then communicated to users across the country. The NLDN system thus monitors and geolocates accurately the twenty to twenty five million cloud-to-ground lightning strikes that occur every year across the contiguous United States using a network the depends on precise waveform processing, global positioning system (GPS) time synchronization, high-speed signal processing, and wide-band peak gated magnetic direction finding techniques.

NLDN lightning strike data is accessible to subscribers through various DOS, Windows, or Unix based display and analytical software programs. Real-time lightning data may be received for display by such programs from the NLDN via satellite broadcast and dial-up telephone communications. USPLN lightning strike data is available from Weather Decision Technologies of Norman, Okla., via similar communication channels. High performance graphical systems designed for effective interpretation and analysis of lightning information currently are in use. Current systems display lightning strike data in a variety of ways. For example, individual lightning strikes may be indicated by small crosses or Xs overlaid on a graphical map display. The location of each detected lightning strike is represented on the map display by such a marker. Due to the plethora of lightning strikes that occur during a storm, however, the resulting display typically shows large clusters of lightning strike markers overlaid on a map. This provides a good representation of storm location and lightning strike density in general. However, for individual viewers of a weather report presentation it does not provide a very good representation of exactly where lightning is striking, and particularly of the relationship and distance from the strike to the viewer's home or place of work. Lightning data has also been displayed in contours of lightning strike density, to facilitate the identification of high-risk areas in general, and can be color-coded or animated to track developing storms. These methods of displaying lightning strike data are very useful for meteorologists and weather reporters who are watching storm development and providing generalized storm information in a generalized manner to the public. However, individual viewers of a weather presentation may find such presentations of lightning strike data to be of limited value, in that such presentations of lightning strike data do not bring home to the viewer in a personal way that individual lightning strikes may be occurring near the viewer's home or other location of interest.

What is desired, therefore, is an improved system and method for presenting weather phenomenon information, specifically lightning strike information, in a manner that is more easily understandable to viewers of televised and other weather report presentations. Such a presentation of lightning strike information should be easy to interpret by individual viewers in a manner such that a viewer can immediately understand the significance of the weather information being presented to the individual viewer's specific location of interest. Such lightning strike information preferably also may be presented to a user electronically in a personalized manner, e.g., via e-mail, cellular phone, etc., such that the user is made aware of nearby lightning strikes and/or the distance and location of lightning strikes from the user's current location or other location of interest (home, work, school, vacation home, etc.). By tracking the motion of lightning strike areas an advance warning system regarding a viewer's location or locations can be implemented.

SUMMARY OF THE INVENTION

The present invention provides a system and method for presenting lightning strike information in an improved manner such that weather report presentation viewers and other recipients of such information are better able to understand and appreciate the significance of the weather information being provided to them. The present invention may be implemented in a computer system that automatically receives lightning strike data from appropriate data sources and processes the received data to generate easily understandable displays of such information that may be incorporated in a televised broadcast weather report presentation or a weather presentation or warning provided on the internet or via any other communications media.

In accordance with the present invention, lightning strike location information may be presented as a graphical and textual overlay on a graphical representation of a geographic area, such as a computer generated map, satellite image, or the like. The graphical and textual information displayed indicates to viewers of the presentation the specific location of selected lightning strikes occurring during a storm. For example, lightning strike location information may be presented in accordance with the present invention as a lightning symbol or other graphic overlaid on a computer generated map or satellite image of a city or other area along with a textual location label identifying a specific address or a landmark location at which the lightning strike has occurred. The generation of such a lightning strike presentation in accordance with the present invention may be performed automatically by a computer system that receives lightning strike data, including lightning strike location data, from a lightning strike data source, such as the National Lightning Detection Network (NLDN), the United States Precision Lightning Network (USPLN), or any other lightning information source.

During a storm a very large number of lightning strikes are likely to be detected in a given area. If each and every lightning strike detected in an area were displayed the resulting display would often be too cluttered or "busy" to provide an easily understandable presentation. Therefore, in accordance with the present invention the received lightning strike data may be first filtered to select specific lightning strikes to be displayed. In such a case, only lightning strikes satisfying selected filtering conditions are displayed. For example, the lightning strike data may be filtered by lightning amplitude or intensity, geographic location, distance from a landmark, or some other characteristic, or combination thereof. Lightning strike data that satisfies the filtering condition is combined with geographic data to translate the lightning strike location data as provided from the lightning strike data source, e.g., in latitude and longitude coordinates, into a specific street address or landmark location identifier label that will be readily understood by a viewer of a weather presentation incorporating therein the lightning strike information presented in accordance with the present invention. The textual lighting strike location information thus derived is then overlaid, along with a marker indicating the lightning strike location on a graphical representation (e.g., a computer generated map, satellite image, etc.) of the area in which the lightning strike occurs. Thus, a viewer is able to determine quickly and accurately whether or not lightning is striking near the viewer's home or other location of interest. The view of the geographic area displayed in the presentation may automatically be re-centered or otherwise shifted in response to moving locations of lightning strikes to be displayed (e.g., as a storm moves through an area).

In accordance with the present invention lightning strike information also or alternatively may be provided directly in a personalized manner to individual viewer users. For example, such viewer users may be individuals or businesses that provide to a computer system providing lightning strike information in accordance with the present invention an indication of a specific location of interest. Such a location of interest may include the viewer's home, place of work or business, or the like. As lightning strike information is received by the system it is compared to the stored viewer locations of interest. As lightning strikes are determined to occur within a certain range of a viewer location of interest a lightning strike warning or other message may be generated and delivered to a contact address provided by the viewer. For example, the contact address may be an e-mail address, cellular or other phone number or the like. The lightning strike warning message generated and delivered may thus be an e-mail or cellular phone text message providing the distance of the lightning strike from the viewer location of interest, may include a graphical display indicating the location of a lightning strike relative to the viewer's location of interest, and/or may even include a voice message generated, e.g., by a voice message generator in the computer system.

Further objects, features, and advantages of the present invention will be apparent from the following detailed description taken in conjunction with the accompanying drawings.

DETAILED DESCRIPTION OF THE INVENTION

The present invention provides a system and method for presenting weather phenomenon information, specifically lightning strike information, in a manner that is useful and informative to viewers of such information who are not meteorologists or weather experts. The present invention will be described in detail herein with reference to the generation of lightning strike presentations that may be incorporated as part of broadcast or other televised weather report presentations. It should be understood, however, that the present invention also is applicable to the generation of lightning strike information presentations that may be provided to viewers over various other communications media other than broadcast (including over-the-air, cable, satellite, etc.) channels, including weather report presentations delivered to viewers over the interne and via other wired or wireless communications systems, such as cellular phones and the like. In particular, the present invention includes the generation of personalized lightning strike presentations and warnings for individual viewer locations of interest that may be delivered to such viewers over the interne or such other communications systems.

Figure 1:
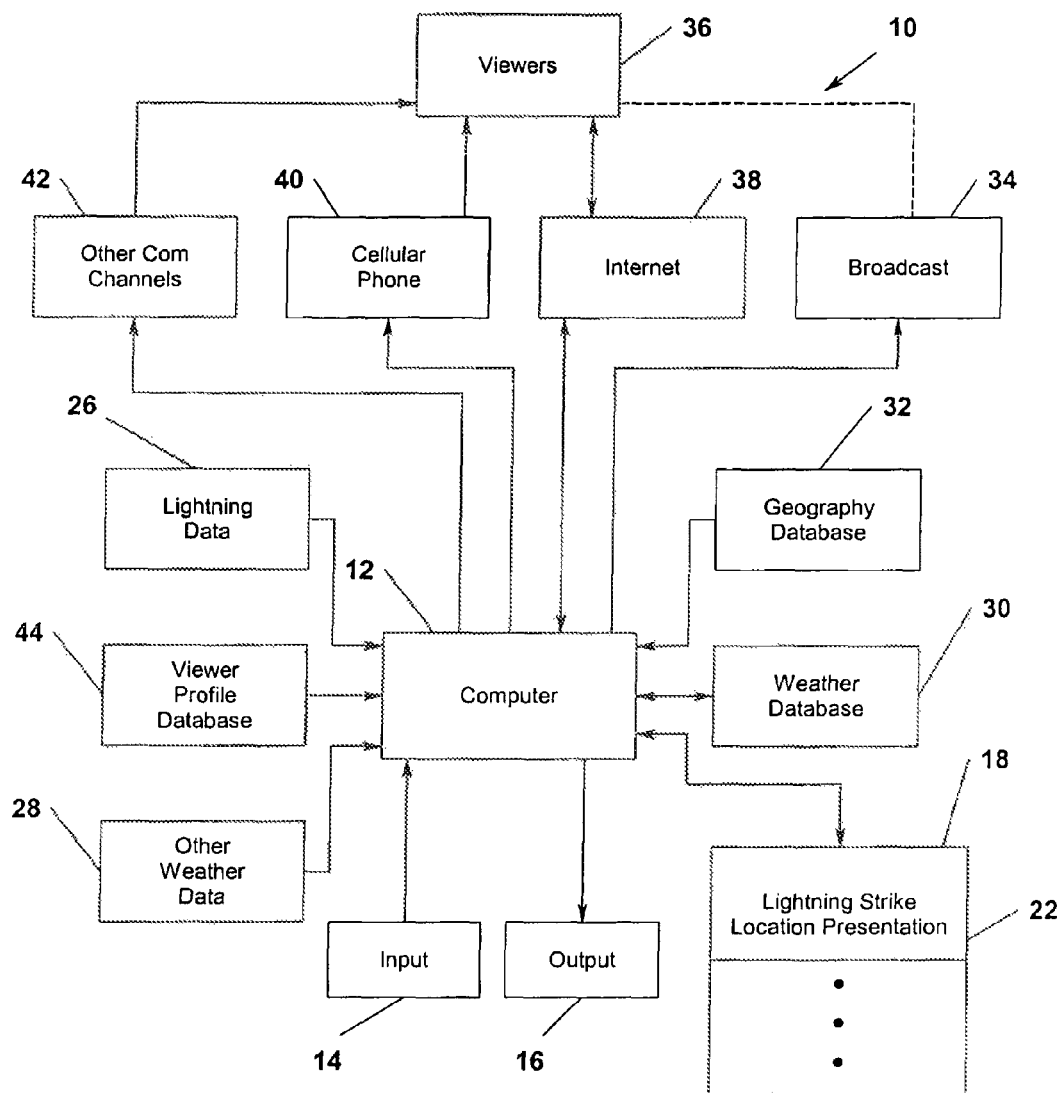
FIG. 1 is a schematic block diagram of an exemplary computer based system for implementing a system and method for generating lightning strike information presentations in accordance with the present invention.

Lightning strike information presentations in accordance with the present invention preferably are generated substantially automatically, i.e., with minimum user interaction required, in a computer based weather presentation generating system. An exemplary computer based system 10 for generating lightning strike information presentations in accordance with the present invention is illustrated in FIG. 1. Any conventional computer system 12 may be used to implement the functions required for generating viewer friendly lightning strike information presentations in accordance with the present invention. Preferably a computer 12 having sufficient processing power and speed to process significant amounts of graphical and other information in a reasonable amount of time is employed. The computer 12 used for generating lightning strike information presentations in accordance with the present invention may be implemented as a single computer or as several computers networked together in a conventional manner. Computers 12 already in use by producers of weather report presentations to generate such reports may be programmed with the additional functionality required to implement a method for presenting lightning strike information in accordance with the present invention. The computer 12 employed to implement the present invention preferably includes conventional input devices 14, e.g., a computer keyboard, mouse, etc., to allow an operator to interact with the program functionality, as well as conventional output devices 16, e.g., one or more high resolution computer displays for reviewing the lightning strike presentations generated by the system 10. Conventional computer memory 18 associated with the computer 12 is used to store the programs which implement the functions of generating lightning strike location presentations 22 in accordance with the present invention in the manner to be described in more detail herein. The computer memory 18 also includes the required operating system and other programs for general operation of the computer 12 on which the system and method for presenting lightning strike information in accordance with the present invention is implemented. Based on the detailed description, exemplary presentation output, and flow chart diagrams described herein, a person of ordinary skill in the art of computer programming for the generation of weather report presentations will be able to implement a system and method for presenting lightning strike information in accordance with the present invention on a conventional computer system 12 as described herein using conventional operating systems and programming languages as commonly used for such applications.

A system 10 for generating lightning strike presentations in accordance with the present invention preferably generates presentations substantially automatically based on lightning strike data that is provided to the system 10 from one or more lightning strike data sources 26. Lightning strike data 26 may be provided to the system 10 from a lightning strike data source such as the National Lightning Detection Network (NLDN) or the United States Precision Lightning Network (USPLN) as discussed above. Such lightning strike data may include information on the location, time, polarity, and amplitude of each detected cloud-to-ground lightning strike occurring in the contiguous United States. Other sources of lightning strike data 26, e.g., for other locations in the world, also may be employed in accordance with the present invention.

The system 10 may also receive other weather data 28 from other weather data sources. Such other weather data 28 may include weather information received from weather radars, such as live local weather radar or the national NEXRAD weather radar system, remote or manned weather observation positions, satellite imagery, etc. Such other weather data 28, in combination with lightning strike data, may be employed by the system 10 to generate a complete weather report presentation, including a lightning strike presentation in accordance with the present invention. Selected weather information from the weather information sources 26 and 28 may be stored for processing in a weather database 30 by the system computer 12.

The system 10 also preferably employs geographic data, including geographic maps and other information, to generate lightning strike location presentations in accordance with the present invention. Such geographic data may be stored in one or more geography databases 32. The geography database may thus include information such as, for example, computer generated maps and/or satellite imagery of geographic areas of interest, as well as geographic information or programs for converting generic geographic coordinates, e.g., latitude and longitude coordinates, to specific address locations, including landmark locations, roads and street, etc. Commercially available geographic map data, satellite imagery, and other geographic information may be employed to populate the geographic database 32, as required.

Lightning strike location presentations generated by the system 10 may be previewed by an operator thereof on the system display screen or other output 16. The resulting lightning strike presentations, either alone or in combination with other presentations of current or forecast weather phenomenon or conditions, may then be sent to a broadcast system 34 for broadcast as part of a televised or other weather report presentation. Lightning strike presentations in accordance with the present invention also may be recorded for broadcast at a later time, and/or may be delivered to viewers 36 via various different communications media including via cable, satellite, computer network (such as the internet 38), wireless communications (such as cellular phones 40), and other direct communication channels 42, etc.

As will be discussed in more detail below, a system and method for presenting lighting strike information in accordance with the present invention may generate lightning strike presentations for broadcast or other distribution to viewers within a particular area of interest as well as, or alternatively, personalized lightning strike information presentations that may be delivered to individual or business viewers 36. Such individual viewers 36 may communicate with the system 10 via conventional wired or wireless communication channels, such as the internet 38, cellular phone 40, or other 42 communication channels, to provide viewer profile information to the system 10. Such viewer profile information may include, for example, one or more viewer locations of interest, such as a home, school, place of business or other operations, etc. The viewer profile information may also include a viewer contact address to which the personalized lightning strike information presentation generated by the system 10 is to be delivered. The viewer contact address may be, for example, an e-mail address, cellular or other telephone number, etc. (The viewer profile information may be provided to the system 10 over the internet 38 via an online user interface of the type illustrated and described in U.S. Pat. Nos. 6,498,987 and 6,823,263 entitled SYSTEM AND METHOD FOR PROVIDING PERSONALIZED WEATHER REPORTS AND THE LIKE and U.S. Pat. No. 6,654,689 entitled SYSTEM AND METHOD FOR PROVIDING PERSONALIZED STORM WARNINGS, the details of which are incorporated by reference herein.) Such viewer profile information may be stored in a viewer information database 44 for use by the system 10 in generating and delivering personalized lightning strike presentations in accordance with the present invention.

Figure 2:
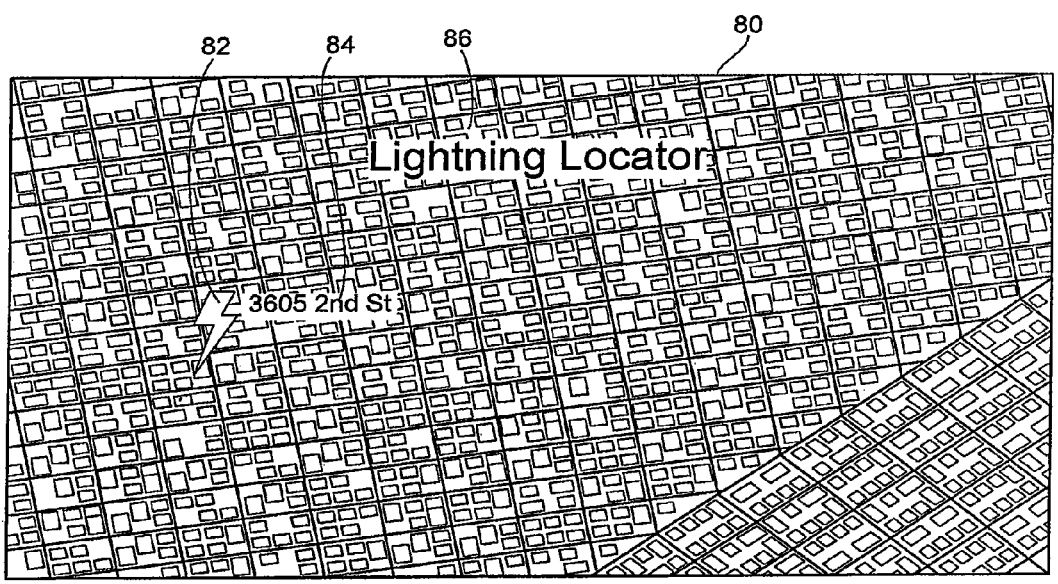
FIG. 2 is an exemplary illustration of a lightning strike information presentation in accordance with the present invention showing the specific address location of a lightning strike overlaid on a satellite image of the area in which the lightning striking occurred.

An exemplary lightning strike location presentation display 80 in accordance with the present invention is illustrated in FIG. 2. In accordance with the present invention, the location of a lightning strike preferably may be indicated by both a marker indication 82 and a textual label 84, identifying the location of a lightning strike, overlaid on a geographic background image 86. The lightning strike location marker 82 may be presented in any form, such as a computer generated lightning bolt, as illustrated in FIG. 2. The textual label 84, identifying the lightning strike location, preferably is presented in a form that will be readily comprehended by a viewer of the lightning strike location presentation 80. For example, a specific street address (e.g., "3605 2nd Street") or well known landmark location (e.g., "East Towne Mall"), used as a textual location label would immediately identify to a viewer where a lightning strike has occurred, thus, providing the viewer an immediate indication of how close the lightning strike is to the viewer's home or other location of interest. The lightning strike location marker 82 and location label 84 may be overlaid on any type of geographic background, such as a computer generated map, a satellite image of a geographic area of interest, etc.

Figure 3:
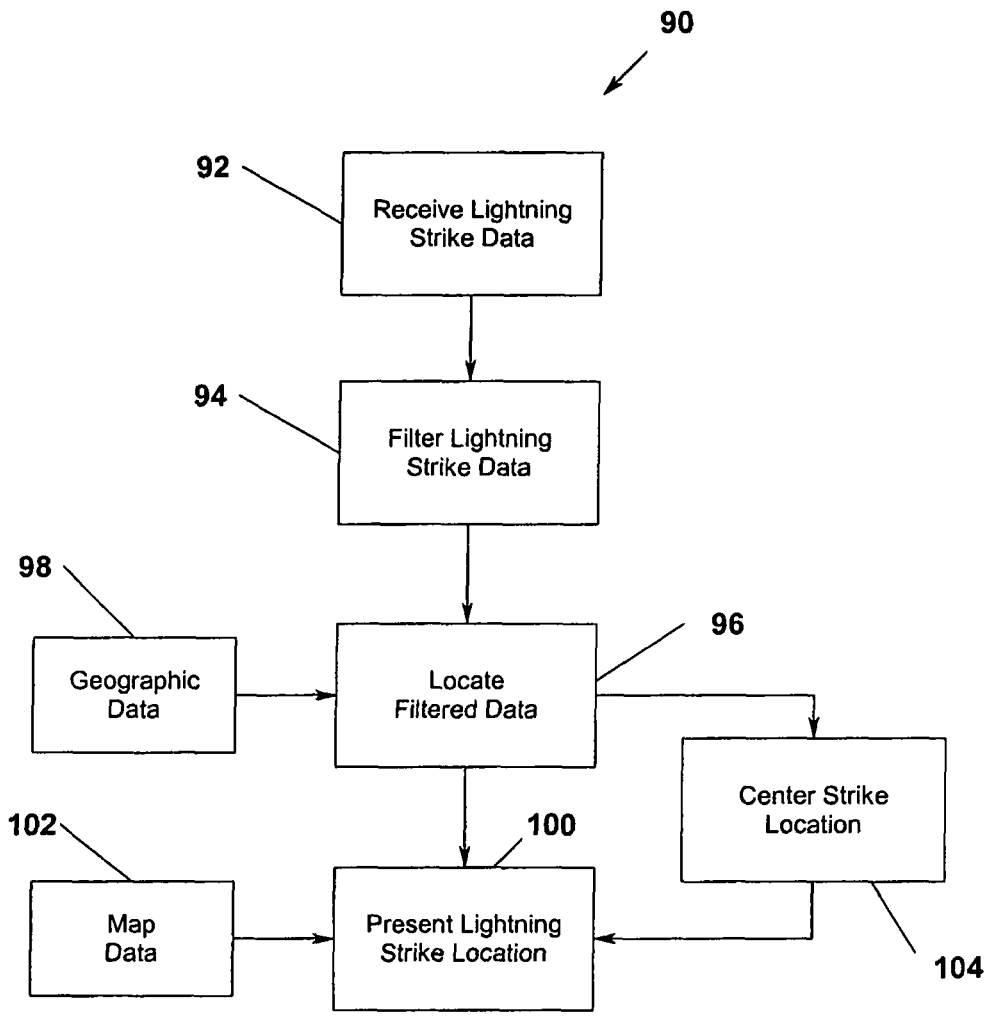
FIG. 3 is a flow chart diagram of an exemplary method for generating a lightning strike location presentation in accordance with the present invention.

An exemplary method 90 for generating a lightning strike location presentation in accordance with the present invention now will be described with reference to FIG. 3. The method begins with the receiving 92 of lightning strike data from a lightning strike data source, such as the NLDN or USPLN. The received lightning strike data may include information on the location, time, polarity, and amplitude of each cloud-to-ground lightning strike detected. In a typical storm a very large number of lightning strikes may be detected within an area of interest. If, in such a case, all the lightning strikes detected were displayed the resulting presentation would be very cluttered and difficult to interpret. Therefore, in accordance with the present invention, the lightning strike data received 92 by the system preferably is filtered 94 to select from the lightning strike data received selected lightning strikes to be displayed in a lightning strike presentation in accordance with the present invention. Any appropriate criteria may be used to filter 94 the lightning strike data to obtain a reasonable number of lightning strikes to display as part of a lightning strike presentation in accordance with the present invention. For example, lightning strike amplitude criteria may be used to select from the lightning strike data only lightning strikes having amplitudes above a selected threshold for display. The lightning strike amplitude threshold may be automatically and dynamically adjustable such that a selected number of lightning strikes over a selected period of time are filtered 94 for display on the lightning strike presentation. Thus, if relatively few lightning strikes are being detected most or all of the lightning strikes may be displayed as part of the presentation, whereas if lightning strike volume increases, only those lightning strikes having the greatest amplitude may be displayed. Other criteria, such as voltage, current, polarity (positive vs. negative stroke), and/or geographic lightning strike location criteria, also or additionally may be employed by the filtering process 94 to select individual lightning strikes to be displayed as part of a lightning strike presentation in accordance with the present invention.

After having filtered 94 the received lightning strike data to identify individual lightning strikes to be displayed, the individual selected lightning strikes are located 96 with reference to geographic data 98, e.g., as stored in the geographic database 32. The process of locating 96 the lightning strikes in the geographic data 98 includes the process of deriving a textual location identification 84 for display as part of the lightning strike location presentation from the lightning strike location received with the lightning strike data. For example, lightning strike data will typically be received from the NLDN, USPLN, or another system as a latitude and longitude coordinate. Such a location identification will be meaningless to most viewers of weather report presentations. Therefore, the step of locating 96 the lightning strike location in the geographic data 98 may include deriving a street address, landmark identification, or other more viewer friendly location identification from the latitude and longitude data provided with the lightning strike information. The exact process for converting the lightning strike location information as received with the lightning strike data to a more viewer friendly form will depend upon how the lightning strike location information is provided in the received lightning strike data as well as the information stored in the geographic database 98.

The determined selected lightning strike location information is then presented 100 preferably as an overlay on geographic map data, e.g., a computer generated map, geographic satellite imagery, etc. As discussed above, a marker 82, or other indication may be located on the map at the position of the lightning strike with a textual label 84 presented identifying in a viewer friendly manner the lightning strike location. The lightning strike marker 82 and location information 84 may be presented on the display for a sufficient period of time for a viewer to comprehend where a lightning strike has occurred before the display may be erased and other lightning strikes presented in a similar manner on the display. Multiple lightning strikes may be presented on the display in this manner at the same time, however, the number of lightning strike presentations provided on a single display should be limited so that the display does not become overcrowded, and preferably in no case should the displayed lightning strike information overlap.

As a storm progresses through a location the lightning strikes displayed may appear to progress across the map area background of the lightning strike display. The geographic area displayed in the lightning strike display may be shifted or re-centered manually by an operator of the system 10 in response to such storm progression. Alternatively, a map background of the lightning strike display may automatically be re-centered 104, e.g., after each lightning strike, or after several lightning strikes are displayed, before the lightning strike is presented overlaid on the map data 102.

Figure 4:
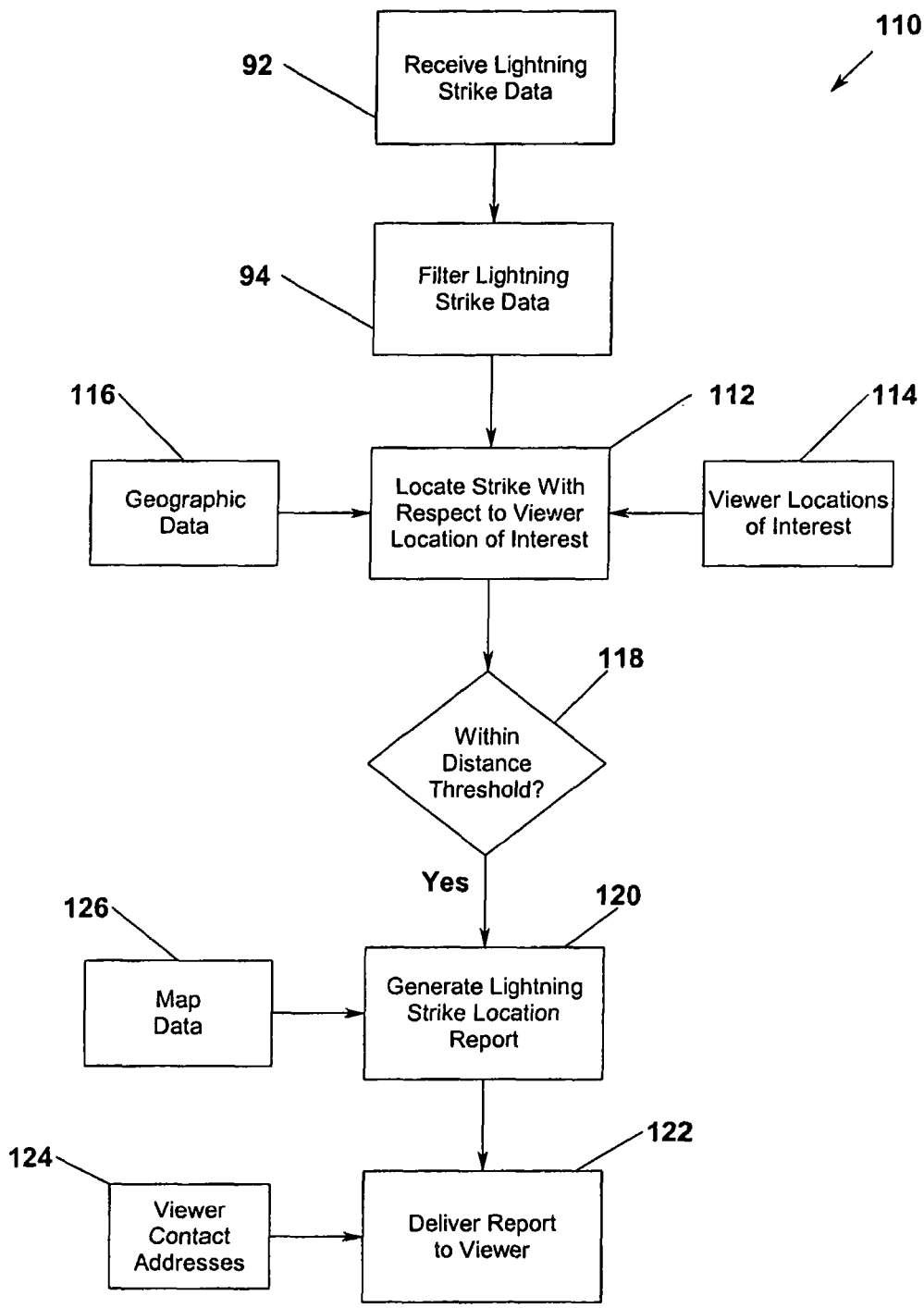
FIG. 4 is a flow chart diagram of an exemplary method for generating a personalized lightning strike location presentation in accordance with the present invention.

An alternative process 110 in accordance with the present invention for generating and providing personalized lightning strike information to viewers now will be described with reference to FIG. 4. This process also begins with receiving 92 lightning strike data from a lightning data source 26. Filtering 94 of the received lightning strike data based on one or more various criteria may be provided, as described above, if desired. For each remaining lightning strike to be considered, the location 112 of the lightning strike with respect to the viewer locations of interest 114 in the viewer profile database 44 is calculated. For example, each viewer location of interest 114 and lightning strike position may be converted to the same coordinate system, e.g., latitude and longitude, using the geographic information 116 in the geography database 32. The distance of the lighting strike from the viewer location may then be readily and automatically calculated 112. (The direction of the lightning strike from the viewer location of interest and other location information may also be determined.)

It may then be determined 118 whether or not the lightning strike distance from any particular viewer location of interest is within a threshold distance and thus is of likely interest to the viewer. This threshold distance may be a fixed distance established by the system operator or may be viewer selectable by the viewer as part of the process of establishing the viewer profile. In the latter case this threshold distance value may be saved as part of the viewer profile in the viewer profile database 44.

If a lightning strike is detected within the threshold distance from a viewer location of interest, a personalized lightning presentation or warning may be generated 120 and delivered 122 to the viewer at the selected user contact address 124. The type of report generated 120 may depend upon the communications channel by which it is delivered. For example, and e-mail or cell phone text message warning may be of the form "At time T a lighting strike was detected distance D and direction DIR from your home, work, etc.". Such a message may be readily converted to a voice message using available voice generation programs and delivered via a cellular or land line telephone. Such a text or voice message may include additional strike attribute information, such as the magnitude of the strike. Alternatively, or additionally, the personalized lightning strike presentation may include a geographic display of the type illustrated above in FIG. 2, showing the lighting strike location on a map or other background with respect to the viewer location of interest. In this case, for example, the geographic display may be centered on the user location of interest, and/or the user location of interest clearly indicated. The text label accompanying the lightning strike indication on the geographic display may indicate the calculated distance between the lightning strike and the location of interest. Such a graphic presentation may be generated using map 126 or other geographic data and delivered as part of an e-mail message or provided at a personalized web page that is accessible via a link provided in such an e-mail message.

It should be understood that the present invention is not limited to the particular exemplary applications and embodiments as illustrated and described herein, but embraces such modified forms thereof as come within the scope of the following claims.

What is claimed is:

1. A computer-implemented method of presenting lightning strike information, stored on a non-transitory computer-readable medium, comprising:
    (a) receiving lightning strike data including lightning strike location data from a source thereof at a computer system;
    (b) deriving textual lightning strike location label identifying a lightning strike location, the label describing a geographic location of the lightning strike, for a single lightning strike from the lightning strike location data; and
    (c) displaying as an overlay on a graphical representation of a geographic area a computer generated marker at the location in the geographic area of the lightning strike along with the lightning strike location label to provide a lightning strike location presentation.

2. The computer-implemented method of claim 1, wherein the lightning strike location label identifies the lightning strike location in a format other than as a longitude and latitude.

3. The computer-implemented method of claim 2, wherein the lightning strike location label identifies the lightning strike location as a street address.

4. The computer-implemented method of claim 1, wherein the lightning strike location data identifies the location of a lightning strike as a latitude and longitude coordinate and wherein deriving a textual lightning strike location label includes deriving a lightning strike location label that identifies the lightning strike location in a format other than as a latitude and longitude from the received latitude and longitude lightning strike location data.

5. The computer-implemented method of claim 1, wherein receiving lightning strike data includes receiving lightning strike data from a source lightning strike data selected from the group of lightning strike data sources comprising the National Lightning Detection Network and the United States Precision Lightning Network.

6. The computer-implemented method of claim 1, further comprising filtering the received lightning strike location data using selected filtering conditions and deriving and displaying the lightning strike location label only for lightning strikes satisfying the selected lightning strike filtering conditions.

7. The computer-implemented method of claim 6, wherein the selected lightning strike filtering conditions include at least one lightning strike characteristic selected from the group of lightning strike characteristics consisting of lightning strike amplitude, voltage, current, and polarity characteristics.

8. The computer-implemented method of claim 1 further including filtering the received lightning strike location data using selected filtering conditions and to derive and display the lightning strike location label only for lightning strikes satisfying the selected lightning filtering conditions, wherein the selected lightning strike filtering conditions include lightning strike characteristics selected from the group of lightning strike characteristics consisting of amplitude, voltage, current and polarity characteristics.

9. The computer-implemented method of claim 1 wherein the graphical representation of the geographic area is a satellite image of the geographic area.

10. The computer-implemented method of claim 1 comprising additionally automatically shifting a field of view of the displayed graphical representation of the geographic area from a previous field of view to a new field of view in response to the determination of selected lightning strike locations to be displayed that would be displayed away from the center of the previous field of view such that such selected lightning strike locations are displayed closer to the center of the new field of view.

11. The computer-implemented method of claim 1 comprising additionally broadcasting the lightning strike location presentation as part of a televised weather report presentation.

12. A computer implemented system for generating a lightning strike location presentation, comprising:
 (a) a computer-implemented geography database including graphical representations of geographic areas;
 (b) a geographic location database of geographic location data;
 (c) a graphical display device; and
 (d) a computer system connected to the geography database to retrieve graphical representations of geographic areas therefrom, to the geographic location database, to the graphical display device, and to a source of lightning strike data including lightning strike location data and adapted to receive lightning strike location data from the source of lightning strike data; to derive at least one textual lightning strike location label identifying a lightning strike location, the label describing a geographic location of the lightning strike, for a single lightning strike from the lightning strike location, data and the geographic location data in the geographic location database, and to display on the graphical display device as an overlay on a graphical representation of a geographic area a marker at the location in the geographic area of the lightning strike along with the lightning strike location label to provide a lightning strike location presentation.

13. The computer-implemented system of claim 12, wherein the lightning strike location label identifies the lightning strike location in a format other than as a latitude and longitude.

14. The computer-implemented system of claim 13, wherein the lightning strike location label identifies the lightning strike location as a street address.

15. The computer-implemented system of claim 12, wherein the lightning strike location data received from the lightning strike data source identifies the location of a lightning strike as a latitude and longitude coordinate and wherein the computer system is adapted to derive a textual lightning strike location label that identifies the lightning strike location in a format other than as a latitude and longitude from the received latitude and longitude lightning strike location data.

16. The computer-implemented system of claim 12, wherein the computer system is adapted to automatically shift a field of view of the displayed graphical representation of the geographic area from a previous field of view to a new field of view in response to the determination of selected lightning strike locations to be displayed that would be displayed away from the center of the previous field of view such that such selected lightning strike locations are displayed closer to the center of the new field of view.

17. The computer-implemented system of claim 12, wherein the computer system is adapted to be connected to a broadcast system and to send the lightning strike location presentation to the broadcast system for broadcasting the lightning strike location presentation as part of a televised weather report presentation.

18. A computer-implemented method of presenting lightning strike information, stored on a non-transitory computer-readable medium, comprising:
 (a) receiving lightning strike data including lightning strike location data from a source thereof at a computer system;
 (b) determining a distance of the lightning strike location from a viewer location of interest;
 (c) comparing the determined distance to a threshold distance; and
 (d) depicting a lightning strike report depicting the determined distance if the determined distance on a map is less than the threshold distance.

19. The computer-implemented method of claim 18, further comprising deriving a textual lightning strike location label identifying a lightning strike location from the lightning 6 strike location data and wherein the lightning strike report includes the textual lightning strike location label, wherein the lightning strike location label identifies the lightning strike location as a street address.

20. The computer-implemented method of claim 18, wherein the lightning strike report includes a textual indication of the determined distance.

* * * * *